United States Patent Office 2,842,402
Patented July 8, 1958

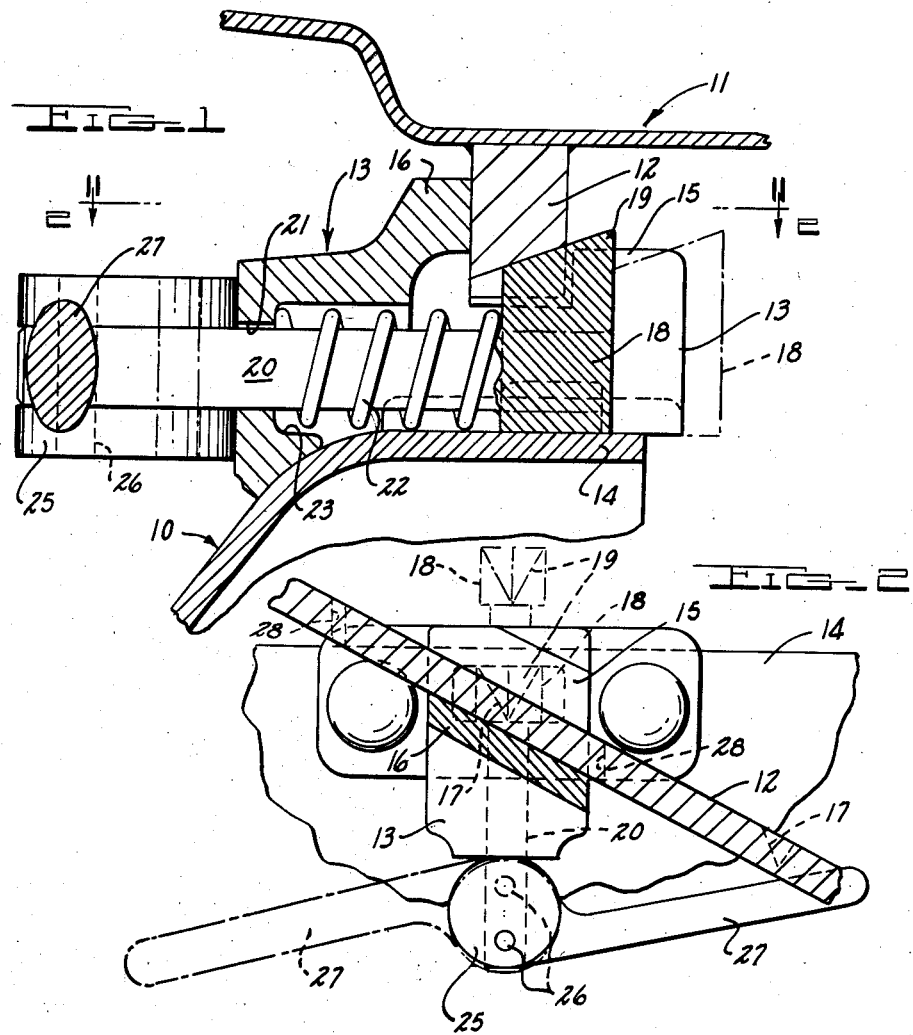
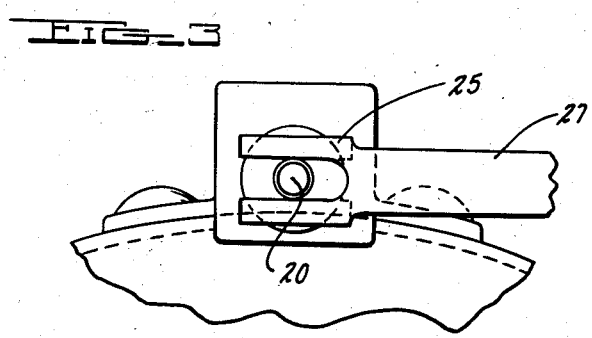

2,842,402

QUICK ACTING WHEEL CLAMP

George F. Fenner, Detroit, Mich., assignor to Kelsey-Hayes Company, a corporation of Delaware Application May 14, 1956, Serial No. 584,860

7 Claims. (Cl. 301—9)

The present invention relates to improvements in a quick acting clamp for adjustable tread wheels. In a wheel of this type the wheel rim has inclined rail members on its inner periphery which have camming engagement against guides on the wheel body, upon relative rotation of the rib and body, and thereby adjust the center distance between the two rims and treads of the vehicle.

It is an object of the invention to provide an improved cam type quick acting clamp capable of being operated in a fraction of the time required to operate the relatively complex bolt and nut locking provisions heretofore employed to hold the wheel members in adjusted position. The invention makes it possible to eliminate the loss of time and expenditure of effort heretofore involved in freeing the wheel members for adjustment and in restoring them to clamped or locked condition after adjustment.

More specifically, it is an object of the invention to provide a quick acting wheel clamp of the above character, comprising a clamping bolt, head or jaw movable on a wheel body to clampingly engage and disengage the rail on the wheel rim, together with a quick take up and release eccentric or cam to operate the head or bolt for such engagement and disengagement. The cam is equipped with an actuating handle by which it is rotated through only 180° about its eccentric axis in the engaging and locking manipulation, and about a reverse 180° to effect disengagement and freeing of the locking bolt or head to permit axial adjustment of the wheel rim and body.

The foregoing as well as other objects will be made more apparent as the description proceeds, especially when considered in connection with the accompanying drawings, wherein:

Fig. 1 is a fragmentary view in section in a radial plane through an adjustable tread structure incorporating a quick acting clamp according to the invention;

Fig. 2 is a fragmentary view in horizontal section along line 2—2 of Fig. 1, the clamp being shown in solid and dot-dash line, respectively, in its operative, locking, and its released positions; and Fig. 3 is a fragmentary side elevational view of the device.

The reference numeral 10 generally designates a portion of a conventional tractor or like wheel body, having a rim 11 associated therewith for axial adjustment inwardly and outwardly of the latter upon relative rotation of the body and rim. The rim 11 has a plurality of axially inclined cam rail lengths 12 welded to its inner peripheral surface for this purpose. The quick acting clamping device of the invention includes a cast housing and mounting member 13 bolted on an axial flange 14 of the wheel body 10, which housing affords a pair of integral, radially outwardly extending, axially spaced guide lugs 15, 16 radially outwardly straddling the rail 12. Hence upon relative rotation of the wheel body 10 and rim 11 the latter will be caused to travel relatively in one axial direction or the other. The housing 13 is shaped on its radially inner surface in conformity with the curvature of the wheel body flange 14, so as to have flush engagement with the same.

The rail 12 is formed with a plurality of locking notches 17 spaced along its radially and axially inner surfaces. These notches are of triangular cross section and they taper convergently from the inner axial side of the rail 12 toward its outer face.

A clamping head or bolt 18 is mounted for axial sliding movement on flange 14, and the head 18 is provided with a central locking or clamping lug 19 at the radially outermost portion thereof. The lug 19 is of the same cross sectional shape as the locking notches 17 in the rail 12, hence has nested engagement with one thereof when the locking head is in its operative position.

An outwardly projecting actuator stud or stem 20 is carried by clamp head 18 being received in an axially extending bore 21 through the housing 13, and a coil spring 22 in an internal recess 23 of the housing urges the head 18 toward its released position, shown, in dot-dash line in Figs. 1 and 2.

Externally of the housing 13 the stem 20 has a circular operating cam 25 mounted thereon by means of an eccentric pivot 26. The cam 25 (as shown in Fig. 3) is in the form of an integral forked extension on an operating handle 27; cam 25 straddles the outer extremity of stem 20, and its circular surface bears slidably against the outer surface of the housing 13 surrounding its bore 21.

The operation of the improved clamp is believed to be clear from the foregoing description. It is in locking or clamping position as shown in solid lines in the three figures, the pin 26 and stem 20 being held outwardly with spring 22 compressed when the pin 26 is at a maximum distance from the housing. The engaging and clamping lug 19 of clamp head 18 is then mated with a rail recess 17 to hold the rim fixed on the wheel body 10. When the handle 27 is swung 180° to the dot-dash position of Fig. 2, the pivot 26 is in a minimum spacing from the housing 13, and the spring 22 urges the clamp head 18 to the dot-dash position of Figs. 1 and 2, releasing the rail and rim 11 for cammed axial adjustment upon relative rotation of the rim and wheel body.

For the purpose of selectively controlling the relative rotatable adjustment of the wheel body and rim, the rails 12 are formed with equally spaced transverse holes 28 therethrough for engagement by suitable shoulder pins which are adapted to be engaged by the adjacent edges of the clamping lugs 16. This insures the registration of the rail notches 17 with clamp head 18 in any adjusted setting of the rim.

A clamp is provided which is simple and compact, and easily and quickly operated by a flip of the hand to actuate it from fully engaged to fully released position, and vice versa. The operating handle is conveniently accessible from the outer side of the wheel structure, yet is sufficiently retracted in relation to the same to avoid snagging objects past which the wheel structure travels.

What I claim as my invention is:

1. A quick acting clamp for a variable tread wheel of the type having a rim shiftable axially of a coaxial wheel body by the relatively rotative coaction of camming members carried for rotation with the rim and body, respectively, comprising a clamp head slidable axially on said wheel body to and from clamping engagement with said rim, a stem on said head, a fixed abutment surface on said wheel body, and an actuator cam eccentrically pivoted on said stem in sliding cam engagement with said abutment surface.

2. A quick acting clamp for a variable tread wheel of the type having a rim shiftable axially of a coaxial wheel body by the relatively rotative coaction of camming members carried for rotation with the rim and body, respectively, comprising a clamp head slidable axially on said wheel body to and from clamping engagement with said rim, a stem on said head projecting axially outwardly of said camming members, a fixed abutment surface on said wheel body and an actuator cam eccentrically pivoted on the projecting portion of said stem and in sliding cam engagement with said abutment surface.

3. A quick acting clamp for a variable tread wheel of the type having a rim shiftable axially of a coaxial wheel body by the relatively rotative coaction of camming members carried for rotation with the rim and body, respectively, comprising a clamp head slidable axially on said wheel body to and from clamping engagement with said rim, a stem on said head projecting axially outwardly of said camming members, a fixed abutment surface on said wheel body, an actuator cam eccentrically pivoted on the projecting portion of said stem and in sliding cam engagement with said abutment surface, and means to impart limited rotation to said cam.

4. A quick acting clamp for variable tread wheel of the type having a rim shiftable axially of a coaxial wheel body by the relatively rotative coaction of camming members carried for rotation with the rim and body, respectively, comprising a clamp head slidable axially on said wheel body to and from clamping engagement with said rim, a stem on said head projecting axially outwardly of said camming members, a fixed abutment surface on said wheel body, an actuator cam eccentrically pivoted transversely on the projecting portion of said stem and in sliding cam engagement with said abutment surface, and means to impart less than a full turn to said cam.

5. A quick acting clamp for a variable tread wheel of the type having a rim shiftable axially of a coaxial wheel body by the relatively rotative coaction of camming members carried for rotation with the rim and body, respectively, comprising a clamp head slidable axially on said wheel body to and from clamping engagement with said rim, a stem on said head projecting axially outwardly of said camming members, a fixed abutment surface on said wheel body, an actuator cam eccentrically pivoted transversely on the projecting portion of said stem and in sliding cam engagement with said abutment surface, means to impart less than a full turn to said actuator cam to engage and disengage said clamping in and out of clamping relation to said rim, and spring means opposing engaging movement of said head.

6. In a variable tread wheel structure having a rim provided with a circumferentially extending and axially inclined rail and a wheel body provided with means cammingly engageable with said rail to effect relative axial adjustment of said rim and wheel body upon relative rotation thereof, a quick acting clamp to secure said rim and body in adjusted position, comprising a clamp member slidable axially on said wheel body into and out of clamping engagement with said rail, said rail being provided with a formation engageable by said clamp member to releasably secure the rim and body in adjusted position, said clamp member being provided with an axially extending element, and a rotative actuator cam operatively connected between said element and said wheel body to control engagement and disengagement of said clamp member with said rail.

7. In a variable tread wheel structure having a rim provided with a circumferentially extending and axially inclined rail and a wheel body provided with means cammingly engageable with said rail to effect relative axial adjustment of said rim and wheel body upon relative rotation thereof, a quick acting clamp to secure said rim and body in adjusted position, comprising a clamp member slidable axially on said wheel body into and out of clamping engagement with said rail, said rail being provided with a plurality of formations selectively engageable by said clamp member to releasably secure the rim and body in adjusted position, said clamp member being provided with an axially extending element, and a rotative actuator cam operatively connected between said element and said wheel body to control engagement and disengagement of said clamp member with said rail.

References Cited in the file of this patent

UNITED STATES PATENTS

| 2,417,139 | Strehlow | Mar. 11, 1947 |

FOREIGN PATENTS

| 479,178 | France | Nov. 26, 1915 |